(12) United States Patent
Guven et al.

(10) Patent No.: US 10,524,141 B2
(45) Date of Patent: Dec. 31, 2019

(54) DESTRUCTIVE TESTING OF NETWORK NODES

(71) Applicant: T-Mobile USA, Inc., Bellevue, WA (US)

(72) Inventors: Mesut Guven, Woodinville, WA (US); Pradumn Bajpai, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/464,185

(22) Filed: Mar. 20, 2017

(65) Prior Publication Data

US 2018/0270676 A1 Sep. 20, 2018

(51) Int. Cl.
*H04W 24/06* (2009.01)

(52) U.S. Cl.
CPC ................... *H04W 24/06* (2013.01)

(58) Field of Classification Search
CPC ...... H04L 41/145; H04L 43/50; H04W 24/06; H04W 56/002; H04W 88/02
See application file for complete search history.

(56) References Cited

U.S. PATENT DOCUMENTS

| | | | | |
|---|---|---|---|---|
| 7,958,560 B1* | 6/2011 | Guruswamy | ......... | G06F 21/566 709/224 |
| 8,095,983 B2* | 1/2012 | Guruswamy | ....... | H04L 63/1433 709/224 |
| 2008/0282352 A1* | 11/2008 | Beddoe | ............... | H04L 63/1433 726/25 |
| 2009/0083854 A1* | 3/2009 | Bozanich | .............. | G06F 21/577 726/23 |
| 2009/0271863 A1* | 10/2009 | Govindavajhala | .... | G06F 21/577 726/23 |
| 2009/0320137 A1* | 12/2009 | White | ................ | G09B 19/0053 726/25 |
| 2009/0328190 A1* | 12/2009 | Liu | ......................... | H04L 43/50 726/14 |
| 2010/0075678 A1* | 3/2010 | Akman | ................. | H04W 24/06 455/436 |

(Continued)

OTHER PUBLICATIONS https://www.synopsys.com/software-integrity/security-testing/fuzz-testing.html, "Fuzz Testing to Find Hidden Vulnerabilities | Synopsis," retrieved Mar. 20, 2017.

*Primary Examiner* — Liton Miah
(74) *Attorney, Agent, or Firm* — Lee & Hayes, P.C.

(57) ABSTRACT

A testing device(s) coupled to a network can test robustness of the network by injecting simulated traffic (one or more first data packets) into the network. Activity of a network node can then be monitored by obtaining first data associated with the network node. Based on the first data, the testing device(s) can determine when (and possibly how) to perform destructive testing for the network node, such as when the first data exhibits a value of a performance metric that satisfies a threshold, or deviates from a predetermined value by at least a threshold amount. Destructive testing can be initiated by generating and sending one or more second data packets that cause an unexpected event at the network node. In response to sending the second data packet(s), the testing device(s) can obtain second data to determine a node response indicating how the network node performed during the destructive testing.

20 Claims, 7 Drawing Sheets

(56) References Cited

U.S. PATENT DOCUMENTS

| | | | |
|---|---|---|---|
| 2010/0284283 A1* | 11/2010 | Golic | H04L 63/1416 370/242 |
| 2013/0103821 A1* | 4/2013 | Gonia | H04W 24/06 709/224 |
| 2014/0022899 A1* | 1/2014 | Bugenhagen | H04L 43/50 370/230 |
| 2016/0028598 A1* | 1/2016 | Khakpour | H04L 43/50 709/224 |

* cited by examiner

DESTRUCTIVE TESTING OF NETWORK NODES

BACKGROUND

The telecom sector continues to see exponential growth in terms of the number of connected devices utilizing telecommunication networks. With trends like Internet of Things (IOT) and Bring your own device (BYOD), such growth is expected to continue. Notwithstanding the development of high throughput and high capacity wireless technologies, networks that support connected devices are being utilized to their limits due to the sheer number of connected devices utilizing the networks.

To ensure that these high service demands are met, network operators test their networks for operability and robustness. For example, a network can be "stress tested" for robustness by deliberately increasing network traffic in order to cause a corresponding increase in central processing unit (CPU) and memory usage on the network nodes. In order to successfully pass a stress test, a network node should not fail (e.g., power cycle) under stressed conditions.

However, today's networks are not tested adequately to ensure full robustness. That is, today's networks are still vulnerable to failure in particular scenarios that aren't covered by existing testing methodologies. A node failure can have a significant impact on a telecommunication network. For example, depending on the coverage area of a network node, such as an Evolved Node B (eNodeB), a single node failure can cause upwards of thousands of outages whereby many customers lose service on their devices. Without adequate testing methodologies, networks remain unstable and vulnerable to failure.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
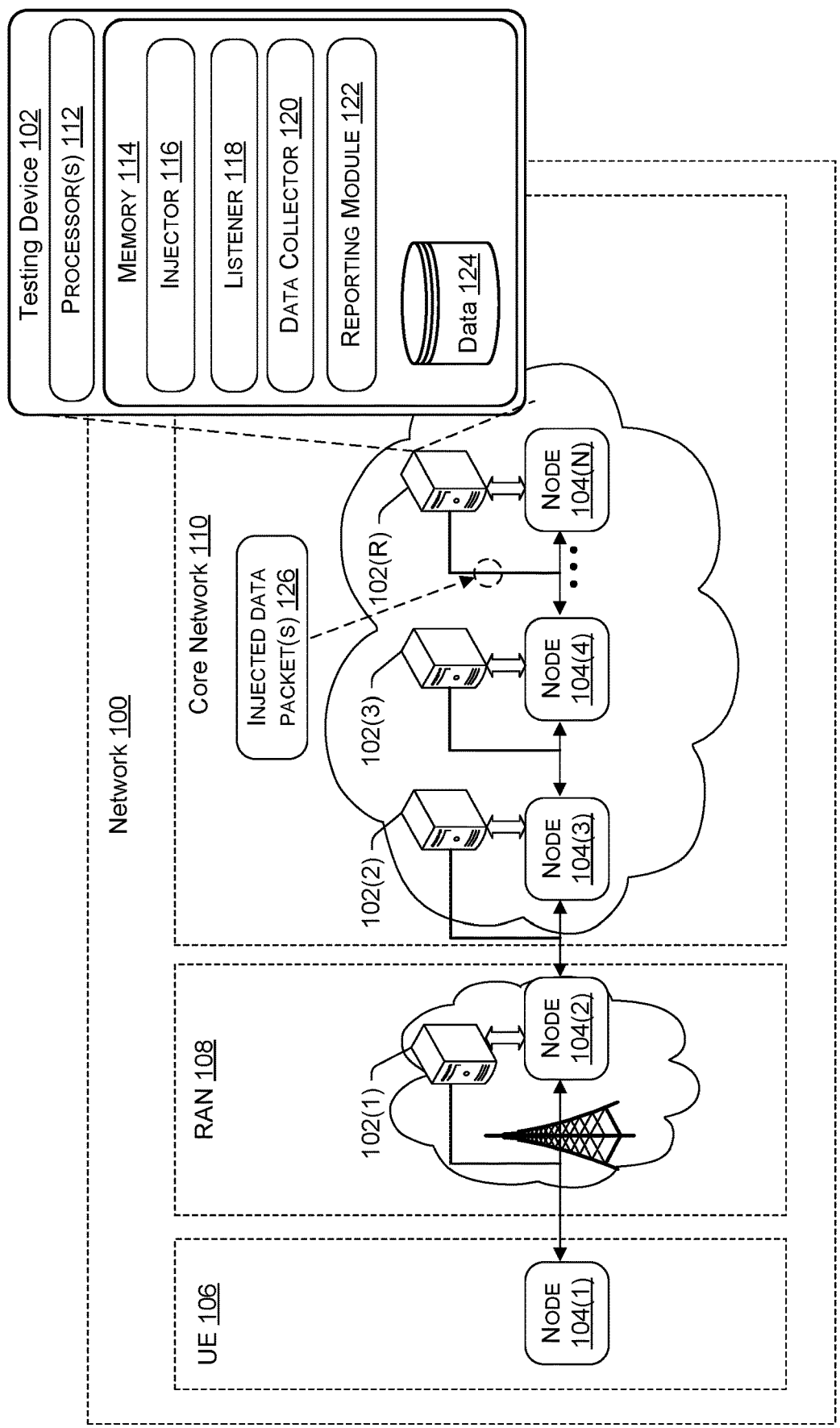
FIG. 1 illustrates an example network, and testing devices coupled to the network to enable destructive testing of network nodes.

Described herein are techniques and systems for destructive testing of network nodes. Specifically, testing algorithms are disclosed for destructively testing one or more network nodes in a network so that robustness of the network can be verified and/or vulnerabilities in the network can be identified and rectified before end users experience outages in a deployed network.

The disclosed testing algorithms can be implemented by one or more testing devices coupled to the network. The testing device(s) implementing the testing algorithms may inject simulated traffic into the network by generating and sending one or more first data packets within the network. The testing device(s) can then monitor activity of a network node within the network during the traffic simulation by obtaining first data associated with the network node. Based on the first data associated with the network node, the testing device(s) can determine when (and possibly how) to perform destructive testing for the network node. In some embodiments, the first data indicates a value of a performance metric for the network node during the traffic simulation, and the testing device(s) can initiate destructive testing for the network node in response to determining that the value satisfies a threshold, or in response to determining that the value deviates from a predetermined value by at least a threshold amount.

The testing device(s) can initiate destructive testing of the network node by generating and sending one or more second data packets within the network, wherein the second data packet(s) cause an unexpected event at the network node. In some embodiments, the second data packet(s) can include at least one malformed data packet that is designed to be unrecognizable when processed. In some embodiments, the second data packet(s) can carry an amount of data that exceeds a maximum amount of data the network node can handle at a given point in time. In response to sending the second data packet(s), the testing device(s) can obtain second data associated with the network node, and determine a response of the network node from the second data. The response may indicate how the network node performed during the destructive testing.

By initially monitoring the network node under simulated network traffic in order to determine when (and possibly how) to initiate destructive testing of the network node, various intelligent testing algorithms can be implemented by the testing device(s), as described herein. For example, the testing device(s) can determine when it may be beneficial to test robustness of a network node, and may manipulate the timing and/or the particular methodologies of destructive node testing to cover varying scenarios. Thus, robustness of a network can be better tested and ascertained in comparison to existing testing methodologies. The testing algorithms can also be implemented in an automated fashion, without human intervention. In this manner, the testing device(s) can monitor network nodes and initiate destructive testing autonomously to gather data regarding network robustness without the involvement of human operators.

It is to be appreciated that the testing algorithms disclosed herein can be used to test robustness of any portion of a network in any network topology. For instance, in a cellular communications network, the testing algorithms can test robustness for any portion of the network, including, without limitation, an endpoint wireless device (e.g., a user equipment (UE)), a node within a radio access network (RAN), a node within an Internet Protocol Multimedia Subsystem (IMS) core network, and so on. In this manner, the techniques and systems described herein can be utilized to identify (or pinpoint) vulnerabilities in any portion of a network so that the vulnerability can be rectified before end users experience network outages in a deployed network. In the absence of vulnerabilities, the techniques and systems described herein can be utilized to confirm that the network is sufficiently robust and resilient, and therefore suitable for deployment. A robust network will respond appropriately and effectively to unexpected events, such as unexpected network traffic/signaling, by continuing to provide service during the unexpected event(s).

Although the techniques and systems disclosed herein are predominantly described with respect to implementation in a cellular network environment, this disclosure is not limited to such implementations. That is, the techniques and systems described herein may be implemented in any suitable network with any network topology and/or networking protocol, including data center networks, wide area networks, local area networks, peer-to-peer networks, mesh networks, and so on.

FIG. 1 illustrates an example network 100, and testing devices 102(1), 102(2), 102(3), . . . , 102(R) (collectively 102) coupled to the network 100. One or more of the testing devices 102 can be utilized to enable destructive testing of one or more network nodes 104(1), 104(2), 104(3), 104(4), . . . , 104(N) (collectively 104) in the network 100.

The example network 100 shown in FIG. 1 represents a cellular communications network that includes, without limitation, a UE 106, a RAN 108, and an IMS core network 110. It is to be appreciated that the network 100 shown in FIG. 1 is merely shown for exemplary purposes, and the techniques and systems described herein can be implemented in any type of network having any network topology. Furthermore, a person having ordinary skill in the art can readily appreciate that different cellular communications networks, such as the network 100 shown in FIG. 1, can be arranged in various topologies with any number and/or types of network nodes 104 (sometimes referred to herein simply as "nodes 104") interconnected in various arrangements via wired and/or wireless couplings. Thus, the nodes 104 in the network 100 can be arranged in any suitable topology, depending on the desired configurations and type of network 100.

In some embodiments, the network 100 may represent a telecommunications network that is maintained and operated by a service provider, such as a carrier of IMS-based services (e.g., mobile telephony services). In some embodiments, the network 100 can be implemented as a "laboratory" or "testing" environment that is modeled after a particular network topology of the service provider's actual telecommunications network. Alternatively, the testing device(s) 102 can be coupled to an actual network 100 that is, or will be, deployed in the field for servicing actual customers. In any case, the nodes 104 represent network equipment that is configured for use in a networked environment.

In the illustrative example of FIG. 1, the node 104(1) may represent the UE 106. The UE 106 may comprise any suitable endpoint device configured to send/receive data to/from the core network 110 via the RAN 108, using any suitable wired or wireless communications protocol. Meanwhile, the node 104(2) may represent an eNodeB, a base station, cellular tower, or any similar device typically deployed in a RAN 108. The nodes 104(3)-(N) may represent IMS nodes typically deployed in an IMS core 110, such as, without limitation, call session control function (CSCF) nodes (e.g., P-CSCF nodes, S-CSCF nodes, etc.), mobility management entity (MME) nodes, serving gateway (SGW) nodes, packet data network (PDN) gateway (PGW) nodes, or any other suitable type of network node 104.

FIG. 1 shows how individual testing devices 102 can be associated with corresponding nodes 104 in the network 100 to enable destructive testing of individual ones of the node(s) 104. However, this one-to-one correspondence is exemplary, and a one-to-many, or many-to-one, correspondence can be implemented as well, without changing the basic characteristics of the techniques and systems described herein. For example, a single testing device 102 can be associated with multiple nodes 104 to destructively test the multiple nodes 104, and/or multiple testing devices 102 can be associated with a single node 104 to destructively test the single node 104, perhaps with different testing devices 102 taking on different roles during testing of the node 104.

An example computer architecture of the testing device 102(R) is shown in FIG. 1. This computer architecture may be representative of the computer architectures of the other testing devices 102 shown in FIG. 1, as well. Furthermore, it is to be appreciated that the testing device 102(R) can include some or all of the modules shown in the computer architecture of FIG. 1, and/or the modules shown in FIG. 1 can be distributed across multiple different testing devices 102 such that individual testing devices 102 may implement some modules, while other testing devices 102 may implement other modules.

In some embodiments, an individual testing device 102 can be "positioned" within the network topology of the network 100 at each interface where network traffic (e.g., data packets) can be generated and injected into the network 100. In this manner, the testing devices 102 can be used to introduce network traffic in the form of data packets at any point within the network 100 to selectively test individual portions (e.g., individual nodes 104, groups of nodes 104, etc.) of the network 100.

In some embodiments, an individual testing device 102 may emulate one or more of the nodes 104 in the network 100. For example, the testing device 102(1) may be configured to emulate the node 104(1), which corresponds to the UE 106. In this scenario, the node 104(2), which may represent an eNodeB of the RAN 108, may receiving traffic from the testing device 102(1) emulating the UE node 104(1), and may be unable to distinguish the testing device 102(1) from the UE node 104(1), and/or the node 104(2) may consider the testing device 102(1) to be an additional UE 106 that is sending data packets to the RAN 108.

In this manner, the individual testing devices 102 may be configured to send data packets within the network 100 using any suitable protocol or signaling to communicate with particular nodes 104 and/or to emulate particular nodes 104. Accordingly, an individual testing device 102 may be configured to transmit/receive data via wires and/or wirelessly using any suitable communications/data technology protocol, or standard, such as, without limitation, Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Internet Protocol (IP), Data Over Cable Service Interface Specification (DOCSIS), digital subscriber line (DSL), synchronous digital hierarchy ("SDH"), synchronous optical networks ("SONET"), multiprotocol label switching ("MPLS"), Dynamic Host Configuration Protocol (DHCP), DIAMETER protocol, Domain Name System (DNS) protocol, File Transfer Protocol (FTP), GPRS Tunneling Protocol (GTP), Hypertext Transfer Protocol (HTTP), Lightweight Directory Access Protocol (LDAP), Session Initiation Protocol (SIP), and/or any other suitable networking protocol, variant thereof, and/or future network technology.

As shown in FIG. 1, an individual testing device 102 may be equipped with one or more processors 112 and one or more forms of computer-readable memory 114. The memory 114 can include various modules including, without limitation, an injector 116, a listener 118, a data collector 120, and a reporting module 122. Various types and forms of data 124 can also be stored in the memory 114 and be made accessible to the testing device 102 for various purposes.

The injector 116 may be configured to inject network traffic into the network 100 by generating and sending one or more data packets 126 within the network 100. The injector 116 may be configured to send the data packet(s) 126 to a specific target node 104 (or destination node 104). The target node 104 can, in some instances, correspond to the node 104 that is associated with the testing device 102. For example, the injector 116 of the testing device 102(R) may be configured to send data packets 126 to the node 104(N) (shown by the double arrow in FIG. 1 to be associated with the testing device 102(R)), while an injector 116 of a different testing device, such as the testing device 102(3), may be configured to send data packets 126 to the node 104(4) (shown by the double arrow in FIG. 1 to be associated with the testing device 102(3)), and so on.

In some embodiments, an authorized user (e.g., a test engineer) can provide input to a computing device to trigger the injection of data packets 126 into the network 100 by the injector 116.

In some embodiments, the injector 116 may randomly generate and inject data packets 126 into the network 100 using load scripts. For example, the load scripts can define times and/or events at which packets 126 are to be generated and sent within the network 100. The load scripts may also define how packets 126 are to be injected, e.g., a target node 104 to which the packets 126 are to be sent, a number of packets 126, an amount of data to be carried by the packets 126, and/or a rate or throughput at which packets are sent to the target node 104.

In some embodiments, the injector 116 may have access to a set of one or more rules that dictate when and how the injector 116 is to inject data packets 126 into the network 100 based on monitored node 104 activity. At least some of these rules may be dependent on the listener 118 of the testing device 102 to monitor node 104 activity during over varying simulated traffic conditions. In some embodiments, the rules may comprise a machine learning model that is used to determine when (and possibly how) to inject data packets 126 into the network 100. In some embodiments, the listener 118 can keep a record on the behavior of the network 100 (e.g., the responses of some or all of the network nodes 104) based on simulated input traffic generated by the injector 116. Such a record of node behavior/responses can be maintained in the data 124 and correlated with contextual information (e.g., time of day, input traffic parameters, etc.). A rules engine of the injector 116 can then be utilized to trigger any scenario learned over time from the recorded node behavior/responses, based on current traffic conditions in the network 100. These and other techniques are discussed in further detail below with reference to the following figures.

The listener 118 may be configured to monitor activity of one or more of the nodes 104 and to interface with the injector 116 in order to trigger the injection of data packets 126 into the network 100. In some embodiments, the listener 118 may analyze data collected by the data collector 120 in order to monitor the activity of the node(s) 104. For example, the listener 118 may analyze values of performance metrics, such as, without limitation, central processing unit (CPU) usage of the node 104, memory usage of the node 104, response time of the node 104, data throughput of the node 104, retransmission metrics of the node 104, or any other suitable performance metric. The listener 118 may be configured to send commands to the injector 116 to inject one or more data packet(s) 126, such as for destructive testing of a node 104, when the performance metric values satisfy particular thresholds, or deviate from predetermined values by a threshold amount.

The data collector 120 may be configured to obtain data associated with one or more of the network nodes 104 during operation of the network nodes 104. The collected data may be stored as the data 124 and made accessible to the testing device 102. The collected data (before or after storage) may also be provided to any of the modules 116, 118, and/or 122 for use in performing various functions with the data. As noted above, the data obtained by the data collector 120 may exhibit one or more values of performance metrics for the network nodes 104. In some embodiments, such performance metrics may represent key performance indicators (KPIs) of the node 104. Accordingly, the data 124 may include performance metrics (e.g., KPIs) for the node 104 that correspond to "normal activity" when the node 104 is under normal conditions. For example, the data 124 may include CPU and/or memory usage metrics of the node 104 when normal volumes of network traffic flow through the node 104 and/or the network 100. Similarly, the data 124 may include response time metrics of the node 104 when normal volumes of network traffic flow through the node 104 and/or the network 100. "Normal" volumes of network traffic may be determined from empirical research/studies of the network 100 during use by end users, such as by analyzing peak usage over a time series of network utilization metrics.

The reporting module 122 may be configured to report information about node 104 performance during, or in response to, destructive testing. The reported information may include a status of the node 104 in terms of whether the node 104 passed or failed (e.g., a failure condition, such as a power cycle, of the node 104) the destructive testing carried out by the testing device(s) 102. This determination may be based on data (e.g., logs, alarms, etc.) collected by the data collector 120 during destructive testing of the node(s) 104, and such data may be stored as the data 124. The reported information may be accessible by a client device of an authorized user, such as a test engineer with credentials to login to an authorized account to view reports from destructive testing of nodes 104 within the network 100.

Figure 2:
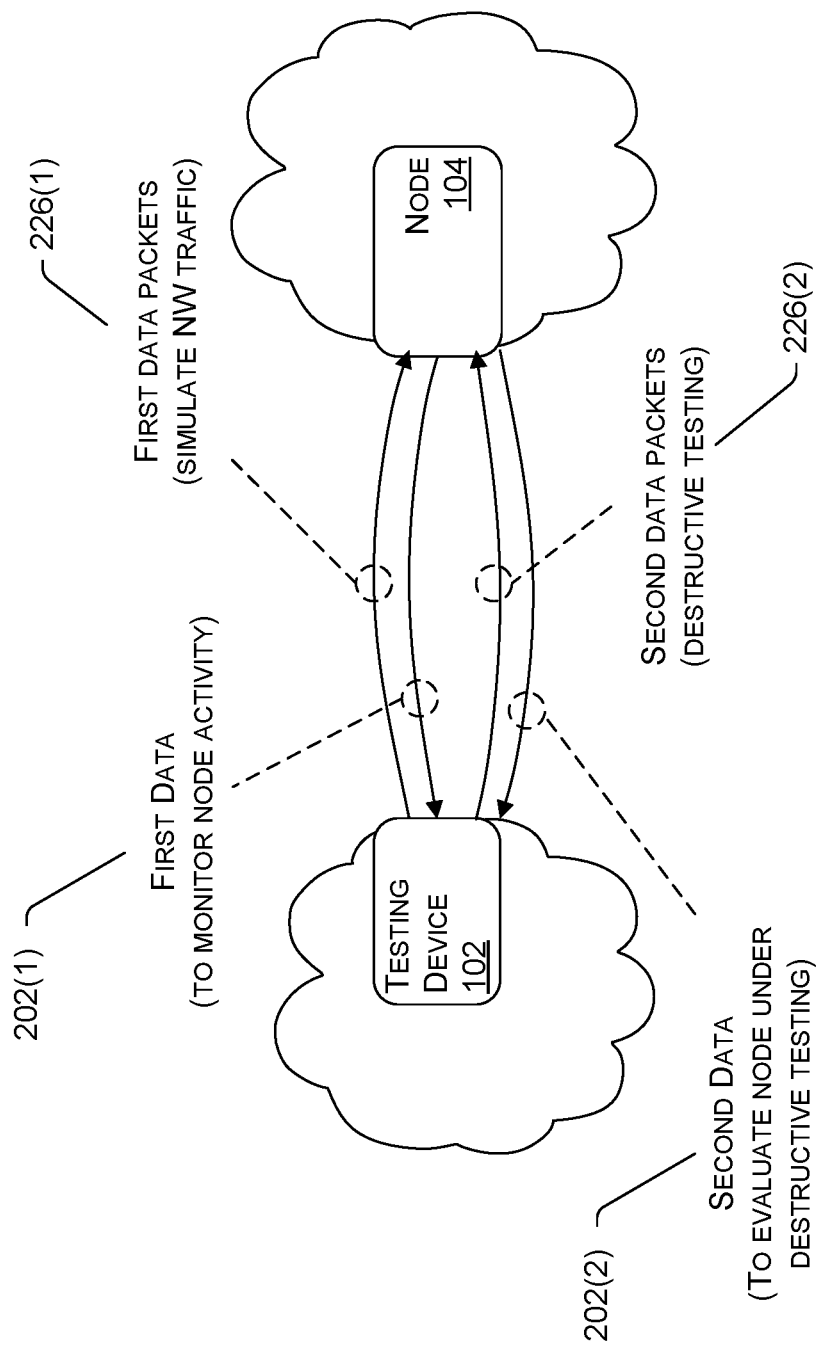
FIG. 2 illustrates a diagram of an example testing algorithm to enable destructive testing of a network node.

FIG. 2 illustrates a diagram of an example testing algorithm to enable destructive testing of a network node 104. FIG. 2 shows a testing device 102 in communication with a network node 104 in the network 100. For example, the testing device 102 may represent the testing device 102(1) of FIG. 1, and the node 104 may represent the node 104(2) in the RAN 108 of FIG. 1. In this example, the node 104 may represent an eNodeB, or a similar device typically implemented in a RAN 108 of a cellular communications network. In general, the testing device 102 of FIG. 2 may be coupled to a network 100 that includes the node 104. The coupling of the testing device 102 to the network 100 may be done in such a way as to allow the testing device 102 to inject network traffic (e.g., data packets 126) within the network 100 at an interface that causes the data packets 126 to arrive at a target node 104, and to allow the testing device 102 to monitor activity of a node 104 of interest.

FIG. 2 illustrates that the testing device 102 may generate and send, via the injector 116, first data packets 226(1) to the node 104 in order to simulate network traffic to the node 104. The first data packets 226(1) can be "standard" data packets or "non-standard" (or malformed) data packets. Standard data packets conform to standards defined for the networking protocol that is implemented by the node 104, and, therefore, "standard" data packets are recognizable to the node 104 that implements the networking protocol. For example, the first data packets 226(1) may have a standard size header and payload, and may include characters in the header and payload that are recognizable to the node 104, pursuant to a standard that governs the networking protocol utilized by the node 104. A non-standard data packet can be made unrecognizable to the node 104 by malforming a standard data packet. For example, a malformed data packet can have a non-standard size (e.g., outside of a standard range of acceptable sizes) header and/or payload, one or more unrecognizable characters (e.g., &, *, etc.) in the header and/or payload, and/or a blank header and/or payload.

The injector 116 may be configured to vary the amount of network traffic and create varying load conditions on the target node 104 by manipulating a number, rate/throughput, and/or amount of data carried by the first data packets 226(1). For instance, a high number of first data packets 226(1), or one or more data packets 226(1) carrying large amounts of data, can be sent to the node 104 in order to model a high load scenario (e.g., a predetermined percentage of the maximum allowed traffic that the node 104 can handle/process at any given time). In this manner, various network traffic conditions can be simulated by the testing device 102 via the first data packets 226(1).

The data collector 120 of the testing device 102 may obtain (or collect) first data 202(1) associated with the network node 104 in response to sending the first data packets 226(1). The listener 118 of the testing device 102 may process (e.g., analyze) this first data 202(1) in order to monitor the activity of the node 104 while processing the first data packets 226(1). This allows the testing device 102 to check the status of the node 104 during the network traffic simulations. For example, the listener 118 can track values of performance metrics for the node 104 (e.g., values corresponding to CPU and/or memory usage of the node 104, response times of the node 104, data throughput of the node 104, etc.).

In some embodiments, the listener 118 may access the data 124 for the monitored node 104 to determine what constitutes "normal behavior" of the node 104. For instance, the data 124 may include "normal" or typical values of performance metrics (e.g., normal CPU and/or memory usage levels, normal response times, normal data throughput levels, etc.), which, as noted above, may be determined from empirical studies. Thus, the listener 118 may compare the values exhibited in the first data 202(1) to the "normal" values in the stored data 124, and may determine, from this comparison, whether the node 104 is deviating from normal behavior by more than a threshold amount. In an example, the listener 118 may be configured to determine when performance of the node 104 degrades from normal by more than a threshold amount, and may send a command to the injector 116 to send one or more second data packets 226(2) to the node 104 for destructive testing of the node 104.

The second data packet(s) 226(2) sent to the node 104 may be generated in such a way as to intentionally cause an unexpected event to occur at the network node 104 for destructive testing purposes. This may be accomplished in a number of ways. For example, the injector 116 can generate the second data packets 226(2) to carry an amount of data that exceeds a maximum amount of data the network node is configured to handle at a given point in time. Thus, the testing device 102 may effectively "ramp up" the traffic volume via the second data packets 226(2) in response to a monitored performance of the node 104 to determine how the node 104 handles the sudden increase in network traffic. In some embodiments, the second data packets 226(2) can be sent to a different target node 104 in the network 100 that is upstream from the node 104 shown in FIG. 2 so that the testing device 102 can determine how the node 104 of FIG. 2 is affected by the processing of the second data packets 226(2) by the upstream node 104. In some embodiments, a randomization technique may be used to randomize the second data packet(s) 226(2) in a way that does not conform with a standard application programming interface (API) specification for the node 104, rendering the randomized stream of second data packets 226 unrecognizable to the node 104.

In some embodiments, the second data packet(s) 226(2) can include at least one malformed data packet to cause an unexpected event at the network node 104. Malforming a data packet may include determining a networking protocol utilized by the node 104, and manipulating a variable of the protocol to render the data packet unrecognizable to the node 104. For instance, one or more of the second data packets 226(2) can comprise a non-standard size of a header and/or payload, one or more unrecognizable characters (e.g., &, *, etc.) in the header or the payload, and/or a blank header and/or blank payload.

The data collector 120 of the testing device 102 may obtain (or collect) second data 202(2) associated with the network node 104 in response to sending the second data packets 226(2). In some embodiments, the second data 202(2) comprises logs, alarms, or any other suitable data about the activity and/or performance of the node 104 that can be obtained. The listener 118 of the testing device 102 may process (e.g., analyze) this second data 202(2) in order to monitor the activity/performance of the node 104 while processing the second data packets 226(2) (i.e., while under destructive testing). This allows the testing device 102 to determine how the node 104 responds or performs during the destructive testing involving the second data packets 226(2). For example, the listener 118 may determine a response of the node 104. The node response can include a response metric, such as a number of power cycles of the node 104, a data throughput of the node 104, or any other suitable response metric that may indicate a failure condition of the node 104. A failure condition may be defined in any suitable manner, such as if the node 104 power cycles at all during the destructive testing, whether the node 104 freezes (e.g., a data throughput of zero), whether a data throughput of the node 104 falls below a threshold level (e.g., deviates from a "normal" throughput performance metric beyond some threshold amount), or any other suitable condition for node failure. The node response can also include an indication as to whether the node 104 re-routed traffic to another node(s) 104. For instance, if the node 104 is unable to handle the second data packets 226(2), an appropriate response in a robust network 100 may be the re-routing of at least some of the second data packets 226(2) to another node 104 in the network 100 with available capacity to handle the second data packets 226(2). In this scenario, a failure condition may be indicated in the node response if some or all of the second data packets 226(2) are not picked up by other nodes 104 in the network 100, or otherwise if some or all of the second data packets 226(2) are dropped. In some embodiments, the node 104 may be configured to activate redundant resources (e.g., additional CPU resources, memory resources), or the node 104 may be configured to cache data packets until they can be processed. In these scenarios, the amount of traffic generated by the second data packets 226(2) can be an amount that is expected to cause the node 104 to activate backup resources and/or cache the data packets 226(2) until resources are freed up to resume a normal state, and the listener 118 may determine a node response that indicates whether these mechanisms were employed to handle the increased amount of traffic. Thus, the second data 202(2) can be used to determine a robustness of the node 104 and/or the network 100. A failure condition may correspond to a software crash, hard drive malfunction, or other system failures of the network equipment under evaluation. A node 104 that fails during the destructive testing process may be identified as a vulnerability in the network 100, and remedial action can be taken to remediate the vulnerability (e.g., by adding redundancy in the vulnerable portion of the network through increased capacity, re-routing processes, etc.).

It is to be appreciated that different performance thresholds can be utilized at different stages of the testing algorithm. For instance, the first data 202(1) can be analyzed to determine if performance of the node 104 has degraded below a first threshold level, which triggers the destructive testing via the injection of the second data packet(s) 226(2), and then the second data 202(2) can be analyzed to determine if performance of the node 104 degrades below a second threshold level that is more extreme (e.g., lower or higher, depending on the type of performance metric) than the first threshold level used to trigger the destructive testing.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
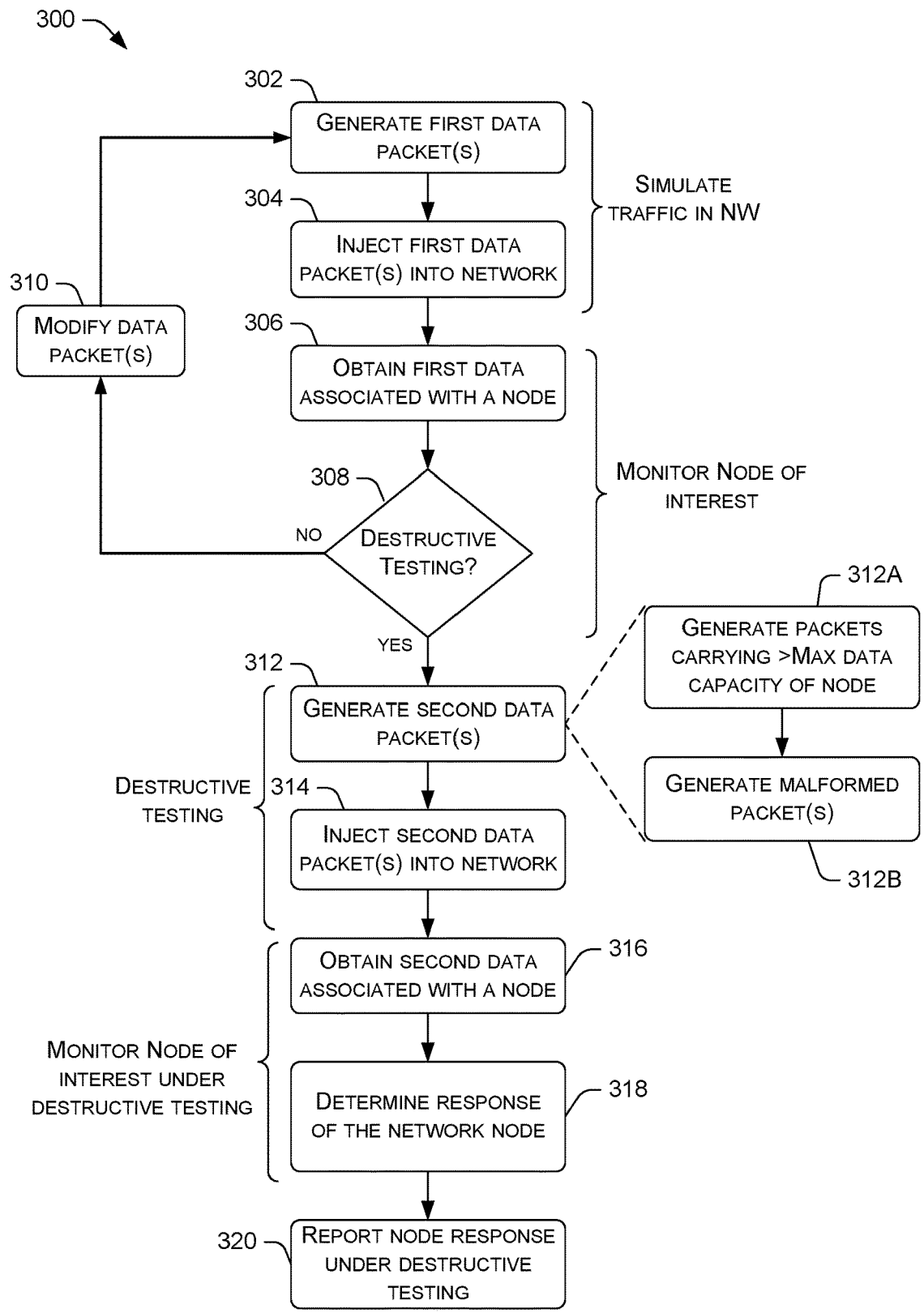
FIG. 3 illustrates a flowchart of an example process for destructively testing a network node.

FIG. 3 illustrates a flowchart of an example process 300 for destructively testing a network node 104. The process 300 may be implemented one or more of the testing devices 102 described herein.

At 302, the injector 116 of a testing device 102 may generate one or more first data packets 226(1) that are to be injected into a network 100 that is to be tested for robustness. The generation of the one or more first data packets 226(1) may be done by the injector 116 processing a load script that, when processed, determines parameters of the first data packets 226(1), such as a number of first data packets 226(1), a data throughput or bitrate, an amount of data to be carried by the first data packet 226(1), whether some or all of the first data packets 226(1) are to be generated by malforming a data packet to be unrecognizable to a node 104 of the network 100, and so on.

At 304, the injector 116 injects the first data packet(s) 226(1) into the network 100 by sending the first data packet(s) 226(1) to a target node 104 within the network 100. The testing device 102 may be coupled to the network 100 so as to be "positioned" at an interface in the network 100 where the transmission of data packets will reach a target node 104 in the network 104. In some embodiments, the testing device 102 may be configured to select a target node 104 among multiple available target nodes 104 to which the first data packet(s) 226(1) are to be sent.

FIG. 3 illustrates how the performance of blocks 302 and 304 result in simulating network traffic flow within the network 100. The load script processed by the injector 116 to simulate network traffic in this manner may cause the injector 116 to simulate network traffic in the network 100 over various different conditions, such as high load/volume, low load/volume, or medium load/volume scenarios. In an example, the injector 116 can generate and send a particular percentage or proportion of a maximum capacity data throughput of a node 104 under evaluation to simulate any suitable network traffic scenario. In some embodiments, the first data packet(s) 226(1) are generated at 302 and sent at 304 to simulate random, or semi-random, network traffic scenarios at a network node 104, such as by generating bursts of data packets 226(1) for high volume traffic simulation interspersed with randomized low volume traffic.

At 306, the data collector 120 may obtain, in response to sending the first data packet(s) 226(1) at block 304, first data 202(1) associated with a network node 104 in the network 100. The injector 116 may send the first data packet(s) 226(1) to a target node 104 at block 304, and the data collector 120 may obtain the first data 202(1) associated with the same target node 104. In some embodiments, the first data packet(s) 226(1) are sent to a target node 104 at block 304 (e.g., an upstream node 104), and the first data 202(1) associated with a different node 104 (e.g., a downstream node 104) is obtained at block 306. The first data 202(1) can comprise any suitable data (e.g., logs, sensor data (e.g., temperature sensor data), etc.) that can be used to monitor (or evaluate) the activity/performance of a node 104 of interest. For instance, the first data 202(1) may indicate whether performance of the node 104 is normal, below normal, above normal, and a degree to which the performance is above or below normal. Values in the first data 202(1) may correspond to various aspects of the node 104, such as CPU utilization, memory utilization, data throughput, response times, retransmissions, and so on.

It is to be appreciated that a record of the first data 202(1) (i.e., node activity/behavior) and the simulated traffic (i.e., the injected first data packet(s) 226(1)) can be stored and maintained as the data 124 in any suitable data repository, such as a database, along with any other suitable contextual information gathered during the performance of blocks 302-306. This may be done continuously over time to obtain a history of recorded node activity/behavior in response to various traffic simulations. In some embodiments, these recorded traffic simulations can be "replayed" for future testing of the network 100. For example, the testing device 102 may reference the data 124 to lookup recorded parameters of the first data packet(s) 226(1) that were generated and injected into the network 100 at some time in the past, and may replicate this traffic scenario to test the network 100 under the same conditions as was done in the past. This may allow the testing device 102 to obtain first data 202(1) during this "replay" test, and compare the first data 202(1) to the first data 202(1) obtained during the previous test to see how the node 104 responses compare. This may allow for in depth learning and analysis tools to implement any desired scenario in the network 100 for testing purposes.

At 308, the listener 118 and/or injector 116 of the testing device 102 may determine whether or not to perform destructive testing for the node 104 of interest (i.e., the node 104 associated with the first data 202(1)), based on the first data 202(1). Various techniques may be utilized to make this determination automatically by the testing device 102. In some embodiments, the decision at block 308 is rules-based, such that by comparing the first data 202(1) to a set of rules accessible to the listener 118 and/or the injector 116, either or both of these modules can determine whether the first data 202(1) satisfies one or more of the rules to initiate destructive testing of the node 104. An example rule may be if a value of a performance metric satisfies a threshold (e.g., CPU usage of the node 104 is at 85% of maximum usage capacity), then destructive testing of the node 104 is initiated. Another example rule may be if a value of a performance metric deviates from a predetermined value by at least a threshold amount (e.g., a data throughput value in the first data 202(1) is below a "normal" data throughput value by a particular amount), then destructive testing of the node 104 is initiated.

Another example technique is to use machine learning for the determination at block 308. For example, a machine learning model may be trained on previous performance data of the nodes 104 in the network 100 (e.g., a record of past node behavior/responses and contextual data associated therewith, such as parameters of network traffic, in the data 124). In this manner, machine learning can be used to learn the input (e.g., parameters of network traffic flow, performance metric values of nodes 104, etc.) that causes particular node behavior, such as node failures (e.g., power cycling, crashing, etc.). Thus, during the process 300, a trained machine learning model, which may be implemented as a rules engine, can process the parameters of the simulated traffic (e.g., the first data packet(s) 226(1)) and the first data 202(1) as input to predict a likelihood of node failure, and to trigger any other useful scenario based on what is happening in the network 100 at any given moment. The determination at 308 may be based on machine learning model output indicating a likelihood of node failure at or above a threshold probability. In yet other embodiments, a non-linear algorithm can be utilized for the determination at block 308. For example, in some instances, a particular value of a performance metric for the node 104 of interest may not trigger destructive testing, while in a subsequent instance, the particular value of the performance metric of the node 104 will trigger destructive testing at block 308. This may be based on any suitable randomization technique to subject the network 100 to a robust set of destructive testing scenarios.

If the determination at 308 is that destructive testing is not to be initiated, the process 300 may follow the "no" route from block 308 to block 310 where the injector 116 may be instructed to modify one or more parameters of the first data packets 226(1) and re-generate and send the first data packet(s) 226(1) under the modified parameters at blocks 302 and 304 to iterate the destructive testing decision at 308. This may be done pursuant to a load script processed by the injector 116, and or based on the first data 202(1). In some embodiments, the modification at 310 is based on machine learning model output of a likelihood of node failure. That is, the testing device 102 may learn how to manipulate simulated network traffic through the modification at block 310, and may thereafter utilize a rules engine in order to create or trigger a desired scenario (e.g., high load, low load, medium load, etc.) based on a determination of what is going on in the network 100 from the first data 202(1).

If, or once, the determination at 308 is that destructive testing is to be initiated, the process 300 may follow the "yes" route from block 308 to block 312 where the injector 116 may generate one or more second data packets 226(2) that are generated in such a way so as to cause an unexpected event to occur at the network node 104. As shown in FIG. 3 at block 312(A), this may involve generating the second data packet(s) 226(2) to carry an amount of data that exceeds a maximum amount of data the network node 104 is configured to handle at a given point in time (i.e., exceed a maximum data throughput capacity of the node 104). Thus, the robustness (or recoverability) of the node 104 can be tested by increasing the network traffic to a level that is above the maximum capacity of the node 104. FIG. 3 also shows, at block 312(B), that another way of destructively testing the node 104 is to generate at least one malformed data packet among the second data packet(s) 226(2). A malformed data packet(s) is another way of testing the robustness (or recoverability) of the node 104 in processing an unrecognizable (or non-standard) data packet.

At 314, the second data packet(s) 226(2) are sent by the injector 116 within the network 100. This can involve sending the second data packet(s) 226(2) to the node 104 of interest, or to a different node 104 (e.g., an upstream node 104) that may impact the performance of the node 104 under evaluation when the second data packet(s) 226(2) are processed by the different node 104.

At 316, the data collector 120 may obtain, in response to sending the second data packet(s) 226(2) at block 314, second data 202(2) associated with the network node 104 of interest. The second data 202(2) can comprise any suitable data (e.g., logs, sensor data (e.g., temperature sensor data), alarms, etc.) that can be used determine whether a failure condition of the node 104 occurred.

At block 318, a response of the network node 104 can be determined based at least in part on the second data 202(2). In some embodiments, the response can include a response metric, as described herein, for determining how the node 104 responded to the destructive testing involving the second data packet(s) 226(2). The response metric may indicate a power cycle event occurred during the destructive testing, or that the node's 104 operating system crashed, or that data throughput dropped to a threshold level, and so on. In these scenarios, the response metric may indicate a failure condition of the node 104 and a corresponding vulnerability in the network 100. The node response determined at block 318 can also include an indication as to whether the node 104 re-routed traffic to another node(s) 104. For instance, if the node 104 is unable to handle the second data packets 226(2), an appropriate response in a robust network 100 may be the re-routing of at least some of the second data packets 226(2) to another node 104 in the network 100 with available capacity to handle the second data packets 226(2). In this scenario, a failure condition may be indicated in the node response if some or all of the second data packets 226(2) are not picked up by other nodes 104 in the network 100, or otherwise if some or all of the second data packets 226(2) are dropped. In some embodiments, the node 104 may be configured to activate redundant resources (e.g., additional CPU resources, memory resources), or the node 104 may be configured to cache data packets until they can be processed. In these scenarios, the amount of traffic generated by the second data packets 226(2) in the destructive testing at blocks 312 and 314 can be an amount that is expected to cause the node 104 to activate backup resources and/or cache the data packets 226(2) until resources are freed up to resume a normal state, and the listener 118 may determine a node response at block 318 that indicates whether these mechanisms were employed to handle the increased amount of traffic. The response may otherwise indicate that a failure condition did not occur, and/or that the node 104 responded gracefully to the unexpected event during destructive testing (e.g., gracefully rejected or ignored malformed data packets), re-routed traffic, initiated a backup system, or some other expected behavior that is acceptable in a robust network 100.

At 320, the response metric, and/or information derived from the response metric (e.g., the node 104 passed the test, the node 104 failed the test, information about how the node 104 performed in terms of how close it was to failing, etc.) can be reported by the reporting module 122 to a user, such as an authorized user (e.g., a test engineer with login credentials).

Figure 4:
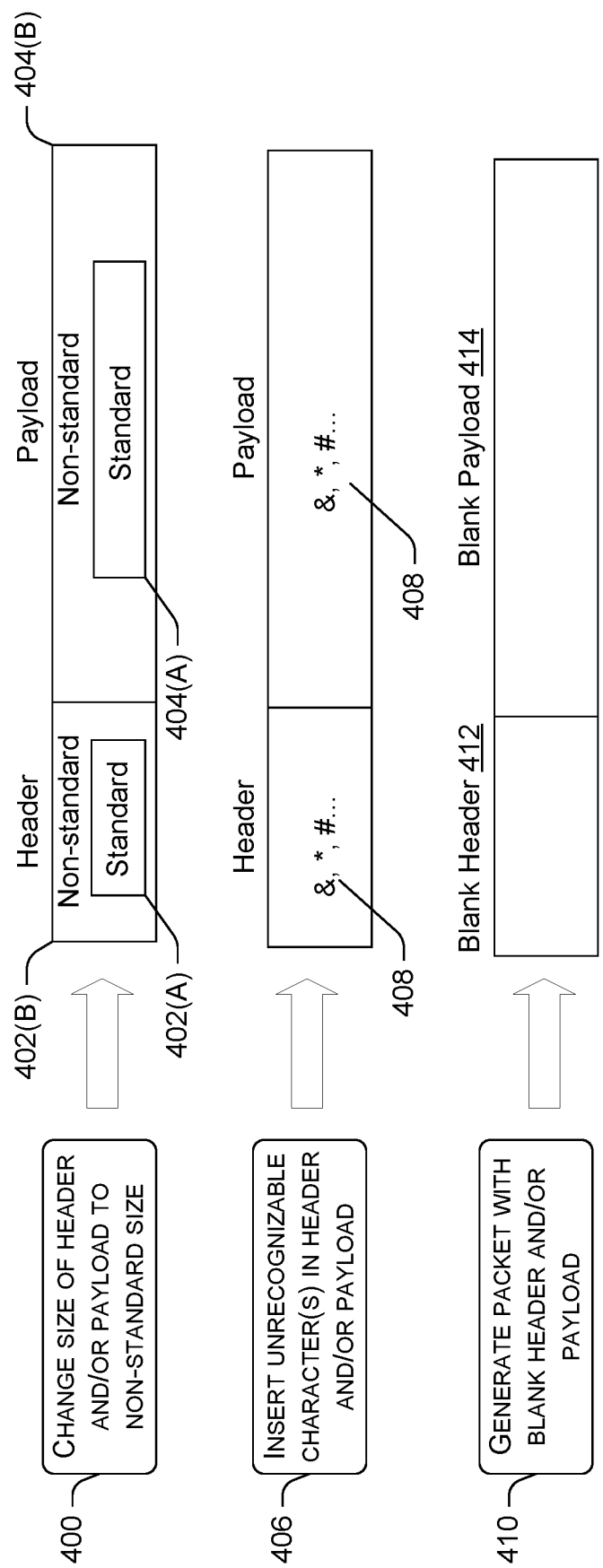
FIG. 4 illustrates example techniques for generating a malformed data packet used in destructive testing.

FIG. 4 illustrates example techniques for generating a malformed data packet used in destructive testing of a network node 104. A first malforming technique 400 may include changing a standard size header 402(A) to a non-standard size header 402(B), such as by increasing the size of the header beyond a maximum allowed size per a networking protocol standard. The injector 116 may access networking protocol information in the data 124 accessible to the testing device 102 in order to determine a standard header size for data packets, and to determine how to change the size to a non-standard size header 402(B). Additionally, or alternatively, the first malforming technique 400 may include changing a standard size payload 404(A) to a non-standard size payload 404(B), such as by increasing the size of the payload beyond a maximum allowed size per the networking protocol standard. The injector 116 may be configured to add useless data to the header and/or the payload of a data packet 126 in order to accomplish the first malforming technique 400.

A second malforming technique 406 may include inserting one or more unrecognizable characters 408 into the header and/or the payload of the data packet. Again, a networking protocol standard may be accessed from the data 124 to determine non-standard characters that do not conform to the standard packet content for a particular networking protocol.

A third malforming technique 410 may include generating a data packet with a blank header 412, and/or a blank payload 414. Assuming a networking protocol standard indicates that a header and/or payload must contain content in order to conform to the standard, this may be yet another way to malform a data packet to make the data packet unrecognizable to a network node 104 utilizing the networking protocol.

Figure 5A:
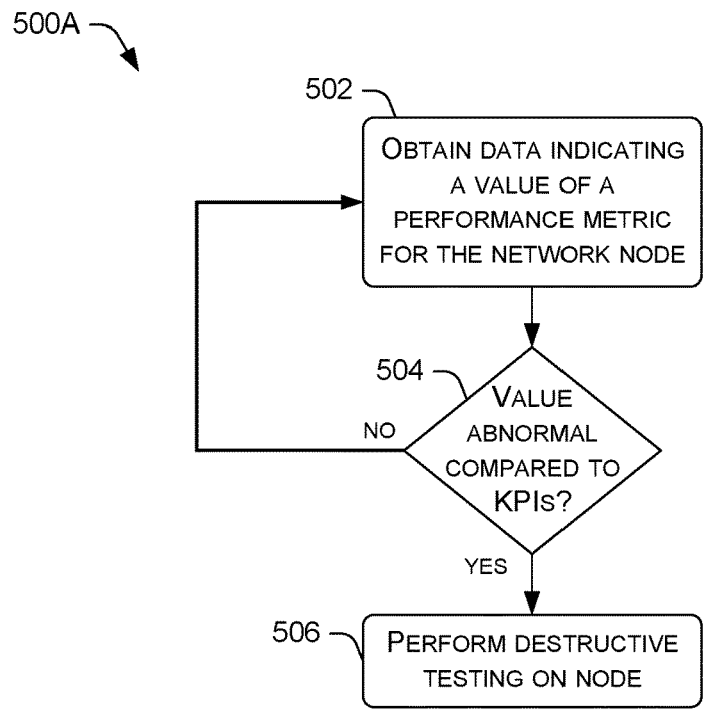
FIG. 5A illustrates a flowchart of an example process for determining when to perform destructive testing of a network node.

FIG. 5A illustrates a flowchart of an example process 500A for determining when to perform destructive testing of a network node 104. The process 500A may represent a more detailed sub-process for decision block 308 of the process 300 shown in FIG. 3.

At 502, the data collector 120 of a testing device 102 may obtain data indicating a value of a performance metric for the network node 104. For instance, the value may indicate a percent or proportion of CPU usage, a percent or proportion of memory usage, a response time, a number of retransmissions, or any other performance metric of the network node 104. The data obtained at block 502 may represent the first data 202(1) referenced in FIGS. 2 and 3, which is obtained during simulated traffic generated by the injector 116 of the testing device 102. In this manner, the listener 118 can monitor the activity or performance of the node 104 using the data obtained at block 502.

At 504, the listener 118 may determine whether the value of the performance metric deviates from a predetermined value of the performance metric by at least a threshold amount. The predetermined value may be a KPI for the node 104 that represents a "normal" performance metric. Thus, any configurable threshold amount of deviation can be utilized to determine whether the performance of the node 104 deviates from normal to a degree that warrants destructive testing. If the deviation from a normal performance metric value is less than a threshold amount at 504, the process 500A may follow the "no" route from block 504 to block 502 where further data is obtained until destructive testing is triggered.

If, at 504, it is determined that the value of the performance metric deviates from a predetermined value by at least a threshold amount, the process 500A may follow the "yes" route from block 504 to block 506 where destructive testing is performed on the node 104, such as by performing blocks 312-320 of the process 300 of FIG. 3. In this manner, the testing device 102 can implement the process 500A to trigger destructive testing of a node 104 in the network 100 when performance deviates from a predetermined performance (e.g., normal performance) beyond a threshold amount. In other words, if the node 104 is exhibiting abnormal performance in the wake of simulated network traffic having particular parameters, the node 104 may be pushed to its limits via destructive testing to evaluate robustness of the network 100.

Figure 5B:
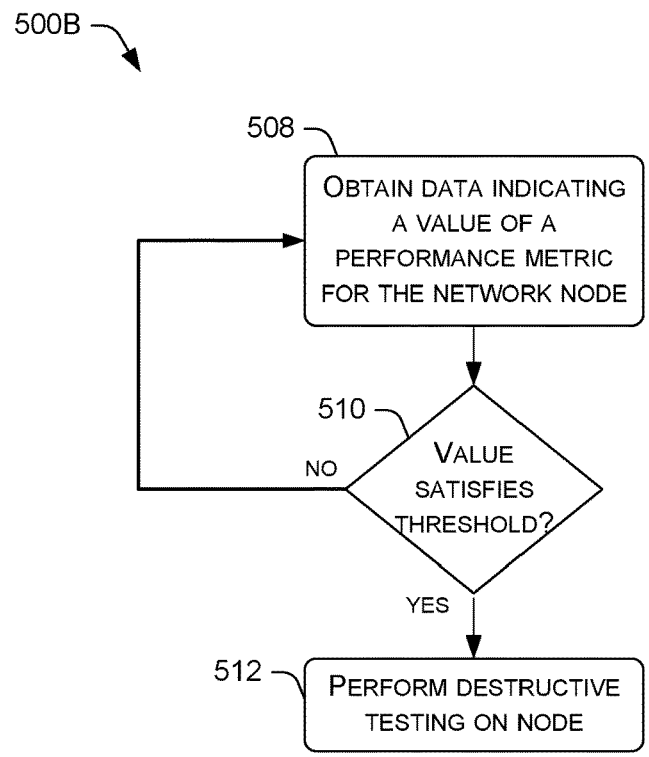
FIG. 5B illustrates a flowchart of another example process for determining when to perform destructive testing of a network node.

FIG. 5B illustrates a flowchart of another example process 500B for determining when to perform destructive testing of a network node 104. The process 500B may represent a more detailed sub-process for decision block 308 of the process 300 shown in FIG. 3.

At 508, the data collector 120 of a testing device 102 may obtain data indicating a value of a performance metric for the network node 104.

At 510, the listener 118 may determine whether the value of the performance metric satisfies a threshold performance metric value. The threshold value evaluated at 510 may be any value, such as a value corresponding to a low volume of network traffic on the node 104, a high volume of network traffic on the node 104, a medium volume of network traffic on the node, which can be exhibited by any of the performance metrics described herein and known to a person having ordinary skill in the art. In some embodiments, the threshold is satisfied at block 510 if the value in the data meets or exceeds the threshold value. It other embodiments, the threshold is satisfied at block 510 if the value in the data is less than or equal to the threshold value. In this manner, various load conditions and network traffic simulations can be implemented with a destructive testing methodology to provide a robust set of testing scenarios for full robustness evaluation.

If the threshold is not satisfied at block 510, the process 500B may follow the "no" route from block 510 to block 508 where further data is obtained until destructive testing is triggered. If, at 510, it is determined that the value of the performance metric satisfies the threshold, the process 500B may follow the "yes" route from block 510 to block 512 where destructive testing is performed on the node 104, such as by performing blocks 312-320 of the process 300 of FIG. 3. In this manner, the testing device 102 can implement the process 500A to trigger destructive testing of a node 104 in the network 100 when performance reaches any configurable threshold. In other words, to destructively test the node 104 for robustness under high load conditions, the threshold can be set at block 510 to a high-load threshold so that destructive testing is triggered when the load on the node 104 reaches a particular level.

Figure 6:
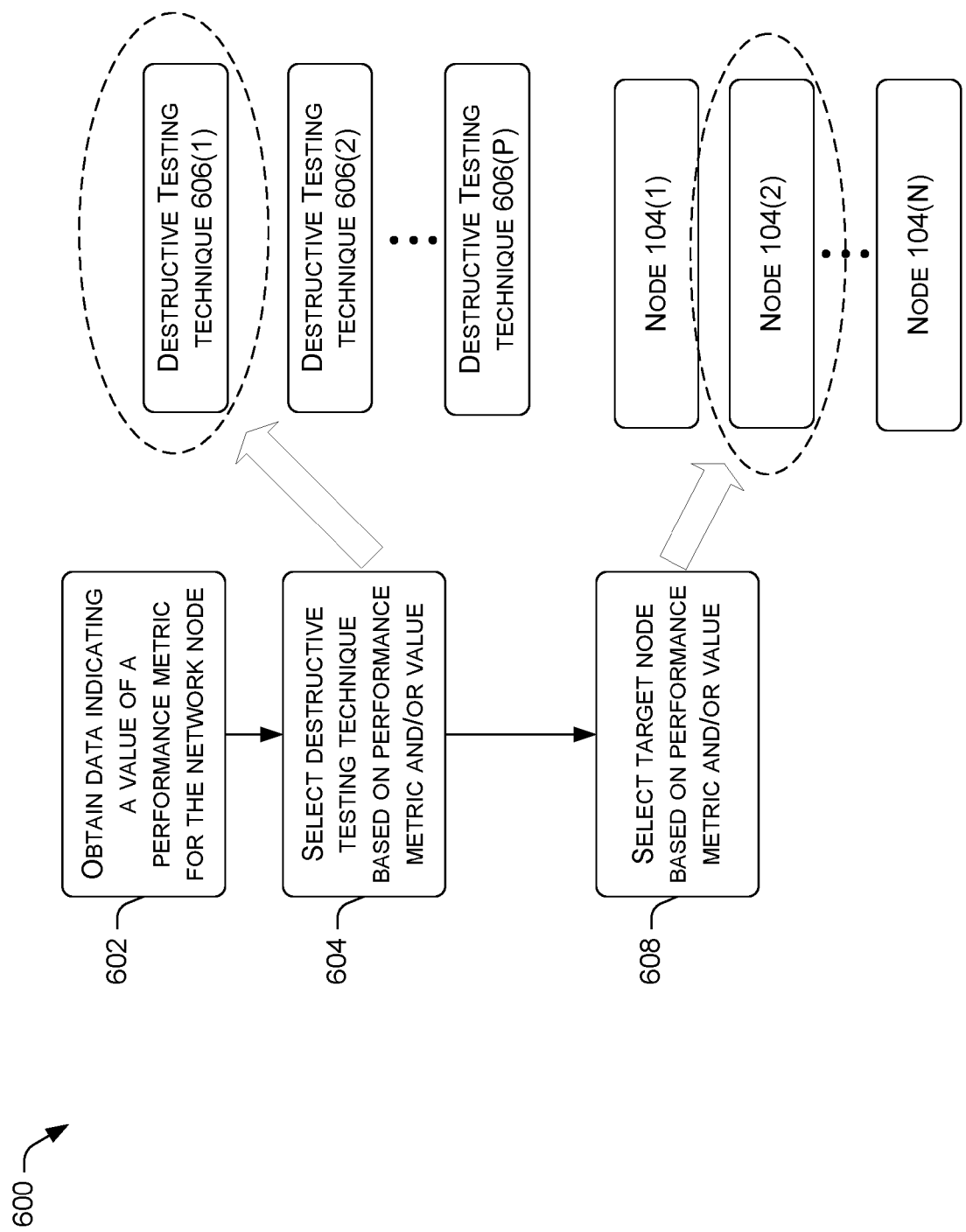
FIG. 6 illustrates a flowchart of an example process for determining how to destructively test a network node based on monitored activity of the network node.

FIG. 6 illustrates a flowchart of an example process 600 for determining how to destructively test a network node 104 based on monitored activity of the network node 104. The process 600 may represent a more detailed sub-process for blocks 312 and 314 of the process 300 shown in FIG. 3.

At 602, the data collector 120 of a testing device 102 may obtain data indicating a value of a performance metric for the network node 104. Similar to the other processes described herein, the value may indicate a value of any suitable performance metric including, without limitation, a percent or proportion of CPU usage, a percent or proportion of memory usage, a response time, a number of retransmissions, or any other performance metric of the network node 104. The data obtained at block 602 may represent the first data 202(1) referenced in FIGS. 2 and 3, which is obtained during simulated traffic generated by the injector 116 of the testing device 102. In this manner, the listener 118 can monitor the activity or performance of the node 104 using the data obtained at block 602.

At 604, the injector 116 may determine a destructive testing technique 606(1) among multiple destructive testing techniques 606(1), 606(2), ..., 606(P), based at least in part on the performance metric and/or the value of the performance metric in the data obtained at block 602. The selection of which destructive testing technique to select at block 604 may be rules-based (e.g., if the performance metric is CPU usage, select destructive testing technique 606(2), if the value of the performance metric satisfies a threshold value or deviates from a predetermined value by a threshold amount, select destructive testing technique 606(P), etc.), or the selection can be based on machine learning model output. For instance, the testing device 102 may learn, over time, based on historical performance data and/or network traffic conditions, a destructive testing technique that is most likely to cause node failure, and this may be exhibited in the machine learning model output to select the destructive testing technique at block 604. The destructive testing technique can be any data packet transmission technique that causes an unexpected event to occur at the network node 104, such as generating a malformed packet (i.e., a packet malforming technique), transmitting a high amount of data or a high throughput known to exceed a capacity of the network node, randomized transmission of packets 226(2), and so on.

At 608, the injector 116 may determine a target network node 104 among the plurality of network nodes 104(1)-(N) to which the one or more second data packets 226(2) are to be sent, based at least in part on the performance metric and/or the value of the performance metric in the data obtained at block 602. The selection of which target node 104 to select at block 608 may be rules-based (e.g., if the performance metric is CPU usage, select target node 104(2), if the value of the performance metric satisfies a threshold value or deviates from a predetermined value by a threshold amount, select target node 104(N), etc.), or the selection can be based on machine learning model output. For instance, the testing device 102 may learn, over time, based on historical performance data and/or network traffic conditions, that sending malformed data packets 226(2) to a target node 104 that is upstream from a node 104 under evaluation is most likely to cause node failure of the node 104 under evaluation, and this may be exhibited in the machine learning model output to select the target node 104 at block 608.

Figure 7:
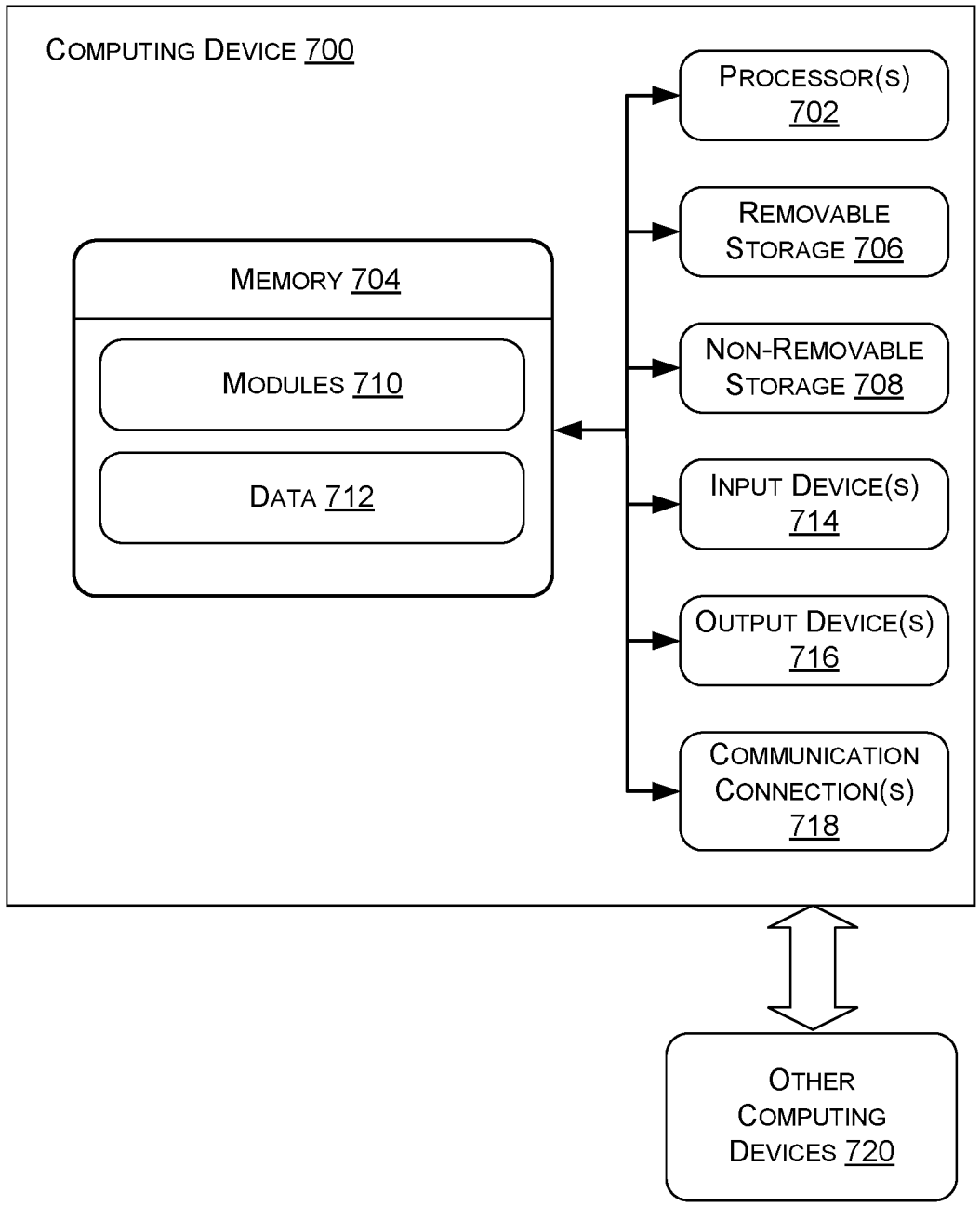
FIG. 7 is a block diagram of an example computing architecture in accordance with various embodiments.

FIG. 7 is a block diagram of an example computing architecture of a computing device 700 in accordance with various embodiments. The computing device 700 may represent the testing device 102, as described herein. FIG. 7 shows the computing device 700 as including one or more processors 702 and memory 704. In some configurations, the processor(s) 702 may correspond to the processor(s) 112 of FIG. 1 and can include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof. Depending on the exact configuration and type of computing device 700, the memory 704 may correspond to the memory 114 of FIG. 1 and can include volatile (e.g., random access memory (RAM)), non-volatile (e.g., read only memory (ROM), flash memory, etc.), or some combination of the two.

The computing device 700 can also include additional data storage devices (removable and/or non-removable) such as, for example, magnetic disks, optical disks, or tape. Such additional storage is illustrated in FIG. 7 by removable storage 706 and non-removable storage 708. In various embodiments, the memory 704 comprises non-transitory computer-readable memory 704 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 704 may also be described as computer storage media and may include volatile and nonvolatile, removable and non-removable media implemented in any method or technology for storage of information, such as computer readable instructions, data structures, program modules, or other data. The memory 704, removable storage 706 and non-removable storage 708 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the processor(s) 702. In some configurations, any or all of the memory 704, removable storage 706, and non-removable storage 706 can store modules 710, including programming instructions, data structures, program modules, and the like, as well as data 712, which, when executed by the processor(s) 702, implement some or all of the processes described herein. The modules 710 may correspond to the modules 116-122 of FIG. 1, and the data 712 may correspond to the data 124 of FIG. 1.

The computing device 700 can also comprise input device(s) 714, such as a touch screen, keyboard, pointing devices (e.g., mouse, touch pad, joystick, etc.), pen, microphone, physical buttons, etc., through which a user can enter commands, information, and user input into the computing device 700.

The computing device 700 can further include one or more output devices 716 for providing output to a user of the computing device 700. The output device(s) 716 can comprise, without limitation, a display, speakers, tactile feedback mechanisms, a printer, and so on.

The computing device 700 can further include communication connections 718 (or communication interfaces 718) that allow the computing device 700 to communicate with other computing devices 720, such as over a network when the computing device 700 is operated in a networked environment, such as over the Internet. The communication connections 718 are usable to, among other things, transmit/receive data over a network to/from the other devices 720, such as one or more computing devices (e.g., nodes 104), one or more servers, and so on. Additionally, the communications connection(s) 718 can enable WiFi-based communication such as via frequencies defined by the IEEE 802.11 standards, short range wireless frequencies such as Bluetooth®, or any suitable wired or wireless communications protocol that enables the computing device 700 to interface with the other devices 720.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
    generating one or more first data packets;
    sending the one or more first data packets within a network comprising a plurality of network nodes;
    obtaining, in response to sending the one or more first data packets, first data associated with a network node in the network;
    determining, based at least in part on the first data, the network node satisfies a threshold;
    initiating, based on the first data satisfying the threshold, destructive testing of the network node, the destructive testing comprising:
        generating one or more second data packets; and
        sending the one or more second data packets within the network to destructively test the network node,
        wherein the one or more second data packets destructively test the network by causing an unexpected event at the network node, and
        wherein the one or more second data packets comprise at least one malformed data packet, the at least one malformed data packet being noncompliant with a networking protocol of the network node;
    obtaining, in response to sending the one or more second data packets, second data associated with the network node; and
    determining a response of the network node based at least in part on the second data.

2. The method of claim 1, wherein:
    the one or more second data packets are generated to carry an amount of data that exceeds a maximum amount of data the network node is configured to handle at a given point in time; and
    sending the one or more second data packets within the network comprises sending the one or more second data packets carrying the amount of data to the network node.

3. The method of claim 1, wherein the at least one malformed data packet comprises at least one of:
    a non-standard size of a header or a payload;
    one or more unrecognizable characters in the header or the payload; or
    a blank header or a blank payload.

4. The method of claim 1, wherein the first data indicates a value of a performance metric for the network node and the threshold indicates a threshold amount, the method further comprising:
    determining that the value of the performance metric deviates from a predetermined value of the performance metric by at least the threshold amount; and
    in response to determining that the value deviates from the predetermined value by at least the threshold amount, determining to perform the destructive testing of the network node.

5. The method of claim 4, further comprising determining a packet malforming technique among multiple packet malforming techniques, based at least in part on the performance metric or the value of the performance metric, wherein generating the one or more second data packets comprises generating the at least one malformed data packet using the packet malforming technique.

6. The method of claim 4, further comprising determining a target network node among the plurality of network nodes to which the one or more second data packets are to be sent, based at least in part on the performance metric or the value of the performance metric, wherein sending the one or more second data packets within the network comprises sending the one or more second data packets to the target network node.

7. The method of claim 4, wherein the performance metric includes at least one of a central processing unit (CPU) usage of the network node, a memory usage of the network node, a response time of the network node, a data throughput of the network node, or a retransmission metric of the network node.

8. The method of claim 1, wherein determining the response of the network node comprises determining a response metric that indicates a failure condition of the network node.

9. The method of claim 1, wherein the at least one malformed data packet comprises at least one of:
a payload that is larger than a maximum allowed size of the networking protocol,
one or more unrecognizable characters in the header or the payload, the one or more unrecognizable characters nonconforming to the networking protocol, or
at least one of a blank header or a blank payload that is noncompliant with the networking protocol.

10. The method of claim 1, wherein the one or more first data packets comprise at least one standard data packet, the at least one standard data packet being compliant with the networking protocol of the network node.

11. One or more non-transitory computer-readable media storing computer-executable instructions that, when executed, cause a computing device to perform operations comprising:
generating one or more first data packets;
sending the one or more first data packets within a network comprising a plurality of network nodes;
obtaining, in response to sending the one or more first data packets, first data associated with a network node in the network;
determining, based at least in part on the first data, the network node satisfies a threshold;
initiating, based on the first data satisfying the threshold, destructive testing of the network node, the destructive testing comprising:
generating one or more second data packets comprising at least one malformed packet, the at least one malformed data packet being noncompliant with a networking protocol of the network node, wherein the one or more second data packets are generated to carry an amount of data that exceeds a maximum amount of data the network node is configured to handle at a given point in time; and
sending the one or more second data packets within the network to destructively test the network node, wherein sending the one or more second data packets within the network comprises sending the one or more second data packets carrying the amount of data to the network node;
obtaining, in response to sending the one or more second data packets, second data associated with the network node; and
determining a response of the network node based at least in part on the second data.

12. The one or more non-transitory computer-readable media of claim 11, wherein the first data indicates a value of a performance metric for the network node and the threshold indicates a threshold value, the operations further comprising:
determining that the value of the performance metric satisfies the threshold value; and
in response to determining that the value satisfies the threshold value, determining to perform the destructive testing of the network node.

13. The one or more non-transitory computer-readable media of claim 12, the operations further comprising:
generating machine learning model output using at least the first data as input; and
based at least in part on the machine learning model output:
generating the one or more second data packets.

14. The one or more non-transitory computer-readable media of claim 11, the operations further comprising determining a packet malforming technique among multiple packet malforming techniques, based at least in part on a performance metric or a value of the performance metric, wherein generating the one or more second data packets comprises generating the at least one malformed data packet using the packet malforming technique.

15. The one or more non-transitory computer-readable media of claim 14, wherein the packet malforming technique comprises at least one of:
changing a size of a header or a payload of the at least one malformed data packet to a non-standard size;
inserting one or more unrecognizable characters in the header or the payload; or
generating the at least one malformed data packet with a blank header or a blank payload.

16. A system comprising:
one or more processors; and
memory storing computer-executable instructions that, when executed by the one or more processors, cause a computing device to:
generate one or more first data packets;
send the one or more first data packets within a network comprising a plurality of network nodes;
obtain, in response to sending the one or more first data packets, first data associated with a network node in the network;
determining, based at least in part on the first data, the network node satisfies a threshold;
initiating, based on the first data satisfying the threshold, destructive testing of the network node, the destructive testing comprising:
generating one or more second data packets, wherein the one or more second data packets include at least one malformed data packet, the at least one malformed data packet being noncompliant with a networking protocol of the network node; and
sending the one or more second data packets within the network to destructively test the network node;
obtain, in response to sending the one or more second data packets, second data associated with the network node; and
determine a response of the network node based at least in part on the second data.

17. The system of claim 16, wherein:
the one or more second data packets are generated to carry an amount of data that exceeds a maximum amount of data the network node is configured to handle at a given point in time; and
sending the one or more second data packets within the network comprises sending the one or more second data packets carrying the amount of data to the network node.

18. The system of claim 16, wherein the at least one malformed data packet comprises at least one of:
a non-standard size of a header or a payload;
one or more unrecognizable characters in the header or the payload; or
a blank header or a blank payload.

19. The system of claim 16, wherein the first data indicates a value of a performance metric for the network node and the threshold indicates a threshold amount; and wherein the computer-executable instructions further causing the computing device to:

determine that the value of the performance metric deviates from a predetermined value of the performance metric by at least the threshold amount; and in response to determining that the value deviates from the predetermined value by at least the threshold amount, determining to perform the destructive testing of the network node.

20. The system of claim 19, wherein the performance metric comprises at least one of:

central processing unit (CPU) usage of the network node;
memory usage of the network node; or
response time of the network node.

\* \* \* \* \*